US007758079B2

(12) United States Patent
Beyer-Meklenburg et al.

(10) Patent No.: US 7,758,079 B2
(45) Date of Patent: Jul. 20, 2010

(54) PERSONAL DOCUMENT IN THE FORM OF A BOOK

(75) Inventors: Guenter Beyer-Meklenburg, Neuruppin (DE); Michael Knebel, Berlin (DE); Detlef Klepsch, Dahlwitz-Hoppegarten (DE)

(73) Assignee: Bundesdrukerei GmbH, Berlin (DE)

( * ) Notice: Subject to any disclaimer, the term of this patent is extended or adjusted under 35 U.S.C. 154(b) by 16 days.

(21) Appl. No.: 11/791,009

(22) PCT Filed: Nov. 16, 2005

(86) PCT No.: PCT/EP2005/012297

§ 371 (c)(1),
(2), (4) Date: Jul. 10, 2007

(87) PCT Pub. No.: WO2006/053738

PCT Pub. Date: May 26, 2006

(65) Prior Publication Data

US 2008/0169638 A1 Jul. 17, 2008

(30) Foreign Application Priority Data

Nov. 17, 2004 (DE) ....................... 10 2004 055 495

(51) Int. Cl.
*B42D 15/00* (2006.01)
*B42D 15/10* (2006.01)
*G09C 3/00* (2006.01)
*B42B 9/00* (2006.01)
*B42B 2/00* (2006.01)
*B32B 5/16* (2006.01)

(52) U.S. Cl. .......................... 283/75; 283/63.1; 283/72; 283/74; 283/76; 283/77; 283/78; 283/83; 283/91; 283/107; 283/109; 283/901; 412/28; 412/35; 428/204

(58) Field of Classification Search ................. 162/140, 162/158, 164.1, 168.1; 281/26, 27; 283/57, 283/63.1, 72, 74, 75, 76, 77, 78, 83, 85, 86, 283/87, 90, 91, 107, 109, 900, 904; 412/28, 412/35; 428/29, 203, 204; 430/10, 14, 280, 430/285, 288, 293, 910, 912; 522/79, 102; 713/186; 726/20; *B42D 15/00, 15/02; D21H 17/33, D21H 17/55, 21/40, 21/48; G03C 1/68; G06K 5/00, G06K 19/06; H04K 1/00; H04L 9/32*
See application file for complete search history.

(56) References Cited

U.S. PATENT DOCUMENTS 2,454,898 A * 11/1948 Tuthill ........................ 156/247

(Continued)

FOREIGN PATENT DOCUMENTS

| | | |
|---|---|---|
| DE | 198 14 420 | 5/1999 |
| EP | 0 936 976 | 8/1999 |
| EP | 1 008 459 | 6/2000 |
| EP | 1 245 407 | 10/2002 |
| EP | 1 329 843 | 7/2003 |
| EP | 1 564 022 | 5/2005 |

*Primary Examiner*—Dana Ross
*Assistant Examiner*—Justin V Lewis
(74) *Attorney, Agent, or Firm*—Jordan and Hamburg LLP

(57) ABSTRACT

The invention relates to a personal document in the form of a book, comprising a book cover, a multi-layered personalised side which contains personalised data, in addition to inner pages. The personalised side and the inner pages are secured by means of a seam to the book cover. The multi-layered personalizing side is provided with a central area which is made of a textile layer which is joined on both sides to a thermoplastic layer which covers the central area until the projecting end. A RFID element comprising an IC element is integrated into the central area for the contactless transfer of biometric data of the personal document owner. The personalised side is sewn by means of a seam in the region of the projecting end.

25 Claims, 3 Drawing Sheets

U.S. PATENT DOCUMENTS 4,849,322 A * 7/1989 Bauer et al. .............. 430/285.1
5,060,981 A * 10/1991 Fossum et al. .............. 283/109
5,958,528 A * 9/1999 Bernecker .................... 428/29
6,135,503 A * 10/2000 Lob et al. .................. 283/63.1
6,213,702 B1 4/2001 Wesselink
6,726,109 B2 4/2004 Yamagishi et al.
2002/0112833 A1* 8/2002 Beghello et al. ............ 162/140
2003/0173408 A1* 9/2003 Mosher et al. .............. 235/492
2004/0223198 A1* 11/2004 Murray et al. ................. 359/1
2006/0119096 A1* 6/2006 Reinhart ...................... 283/72
2006/0179481 A1* 8/2006 D'Agnolo .................... 726/20
2007/0128418 A1* 6/2007 Rosset ........................ 428/212

* cited by examiner

PERSONAL DOCUMENT IN THE FORM OF A BOOK

BACKGROUND OF THE INVENTION

The subject-matter of the invention is a personal document in book form, for example, a passport having a personalized page that together with the other pages of the personal document is bound by means of a seam and attached in a book cover.

The personalized page of a personal document normally comprises a plurality of strata. In particular, when integrating an RFID element for complying with ISO 9303 standards for machine-readable travel documents and for inscribing personal data and the passport photo, sandwich-type layer structures that have long service lives, which are temperature stable, and are protected against falsification are required. Such thermoplastic films and film combinations in general do not provide good articulation properties in the area of the seam. When using polycarbonate (PC) films or polyethylene therepththalate (PET) films, the reverse bending strength is generally limited. In particular, integrating an RFID element into the personalized page requires very thick sandwich-like structures. When using transparent laser-capable polycarbonate (PC) films or transparent laser-capable PET/PE-HD films, the graphic and electronic personalization can be performed in a finished passport document. Existing passport solutions have the problem that they open poorly and do not stay closed well because the stiffness of the personalized page causes the passport not to remain closed or open without the exertion of force.

DE 198 14 420 A1 cites an identification document, such as a passport or the like, that comprises a plurality of sheets that are bound on a seam to make a book. At least one of the sheets forms a data sheet that is provided with information and comprises at least two layers, whereby at least one of the layers is transparent. The format of the layers is selected such that they project beyond the area of the seam, and thus in the area of the seam, connect the data sheet to the other sheets of the identification document. In the area of the information the layers are joined to an inseparable laminate, In the area of the seam, however, they do not adhere to one another.

Thus, the number of bending cycles is intended to be increased and the stiffness of the laminate page is intended to be sharply reduced by the more flexible individual films in the area of the seam. Moreover, in the area of the data sheet, the passport pops open less than with passports that include a data sheet that is laminated across its entire surface. Plastic films made of PC, PETG, or HDT-PETG are preferably used for the films.

EP 1 008 459 B1 refers to a method for producing a booklet, such as, for example, an ID. A band is attached in the same manner as the other sheets of the booklet, and the band is attached to a plate in a special manner, whereby the plate is produced at least partially from a plastic material and has a front side and a reverse side, each side including one page. The aforesaid band is selected, for example, from a synthetic material that is suitable for being sewn in and for frequent bending and is preferably made of polypropylene.

EP 0 936 976 B1 discloses a passport with an information page that contains information about, and an image of, the passport holder, whereby the information page comprises a thermosetting plastic material such as, for example, polycarbonate, and is personalized with laser inscriptions, and whereby this page has a plurality of layers that are laminated to one another using heat and pressure. In the bending area, the output page has a separating layer between the outside layers so that these layers are not laminated, and in this manner, a bendable, long-lived bending location is provided on the information page in the passport.

EP 1 245 407 A2 describes a multi-layer personalized page in a passport that has a plastic layer into which data can be inscribed with the laser. This laser-capable layer made of polycarbonate is laminated by means of PE foam to a flexible backing made of HDPE and is sewn in the area of an excess length of the backing.

The goal of the present invention is to provide an improved personal document in book form that has a longer service life and is less susceptible to falsification.

SUMMARY OF THE INVENTION

The goal is attained in accordance with the invention with a personal document in book form including a book cover, a multi-layer personalized page that contains personal data, and interior pages, whereby the personalized page and the interior pages are attached in the book cover by means of a seam. The multi-layer personalized page has a core stratum comprising a textile layer, and is joined on both sides to at least one thermoplastic layer, which cover the core stratum up to a section of excess length. An RFID element with an IC element for contactless transmission of biometric data from the personalized document is integrated in the core stratum. The personalized page is sewn by means of the seam to the other pages and the book cover in the area of the excess length.

The textile layer of the personal document is preferably a fabric, in particular a polyester fabric and/or a polyester satin fabric. This results in a particularly bendable, long-lived articulation in the area of the seam in the personal document.

Another advantageous embodiment results when the textile layer is a cotton fabric and/or a cotton blend fabric or a microfiber fabric made of thermoplastic fibers. However, it is also possible for the textile layer to be a non-woven fabric.

Particular advantages result in that the textile layer can contain machine-readable security elements, which enhances protection against falsification. Such security elements include added security pigments and/or security prints that are used during authentication of the personal document.

The textile layer in accordance with the invention is provided, on at least one page, with a bonding agent layer that can be applied, for example, in the form of a film, in particular a perforated film, in the form of a random fabric, a coating, or print.

The bonding agent layer preferably comprises a thermoplastic adhesive, in particular a hotmelt, that joins the textile layer to the plastic layer covering the core stratum in a manner that cannot be released without visibly damaging the layers. It is particularly advantageous when a reactive resin or a partially reactive resin mixture is used with which the textile layer and the plastic layer covering the core stratum are joined permanently. Preferably, the plastic layers on the front side and on the back side of the personalized page are joined to one another by lamination.

Preferably, the core stratum has recesses through which the plastic layers of the front side and the back side can join one another in a fused compound. Thus it is practically impossible for a forger to subsequently separate the layers.

In accordance with the invention, the plastic layers covering the core stratum include a first opaque thermoplastic film, for example, a white thermoplastic film, and at least one transparent laser-capable film into which the personalized data, in particular the passport photo, are inscribed with laser irradiation. These layers preferably comprise polycarbonate (PC) and/or polyethylene therepththalate (PET) and/or high-density polyethylene (HDPE) or a blend of these materials. The transparent laser-capable film is covered with a protective layer that is laminated thereto in the same manner and cannot be removed without being destroyed.

The personal document in accordance with the invention has a coil integrated into the personalized page, in particular into its core stratum, for contactless reading of biometric data for the holder of the personal document.

Advantageously, diffractive elements can also be laminated in between the layers of the multi-layer personalized page. Moreover, a photopolymer layer can be arranged there, into which layer a "shadow image" of the photo of the holder of the personal document is inscribed. In addition, as an additional security measure during the laser processing of the personalized page, lasered perforation numbering can be added and thus the protection against falsification is further enhanced.

Additional features and advantages of the invention can be found in the following description of the figures.

DETAILED DESCRIPTION OF THE INVENTION

Figure 1:
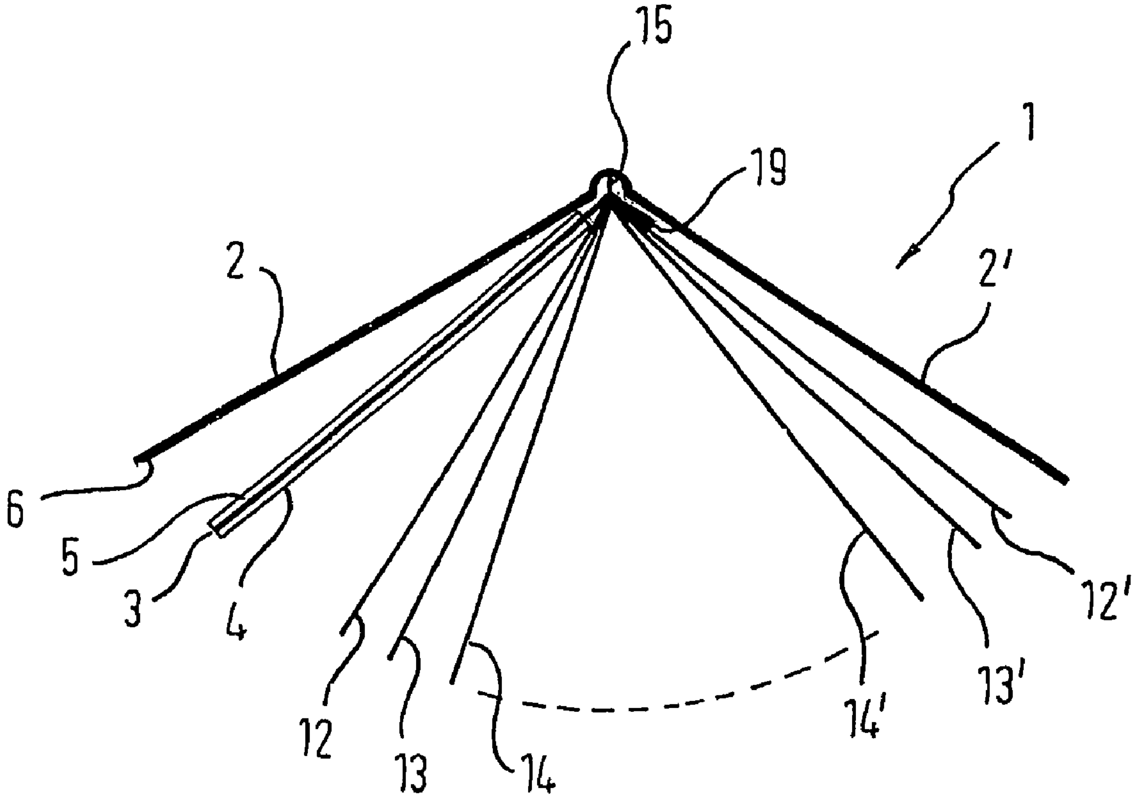
FIG. 1 is a schematic representation of an inventive personal document, partially opened.

FIG. 1 is a schematic representation of an inventive personal document 1, partially opened.

The passport binder 2, 2' is bound by means of the seam 15, with the personalized page 3, 4, 5, 19 and the interior strata 12, 12', 13, 13', 14, 14' into a book, so that a sort of articulation 15 is formed. The number of interior strata can be selected according to the design desired. In this case, only six interior strata are shown for the sake of simplicity.

The personalized page comprises a laminate with a core stratum 3 between plastic layers on the front side 4 and the back side 5. The excess length 19 of the personalized page 3, 4, 5 in the area of the seam 15 comprises only the core stratum 3, which is embodied bendable and made of a textile material such that a personal document produced in this manner can be opened and closed easily without there being a high restoring force and in that a high bending number is possible.

On the front, the passport cover 2, 2' has a projection 6 and can be used with a bound design or in a design that is punched on three sides.

Figure 2:
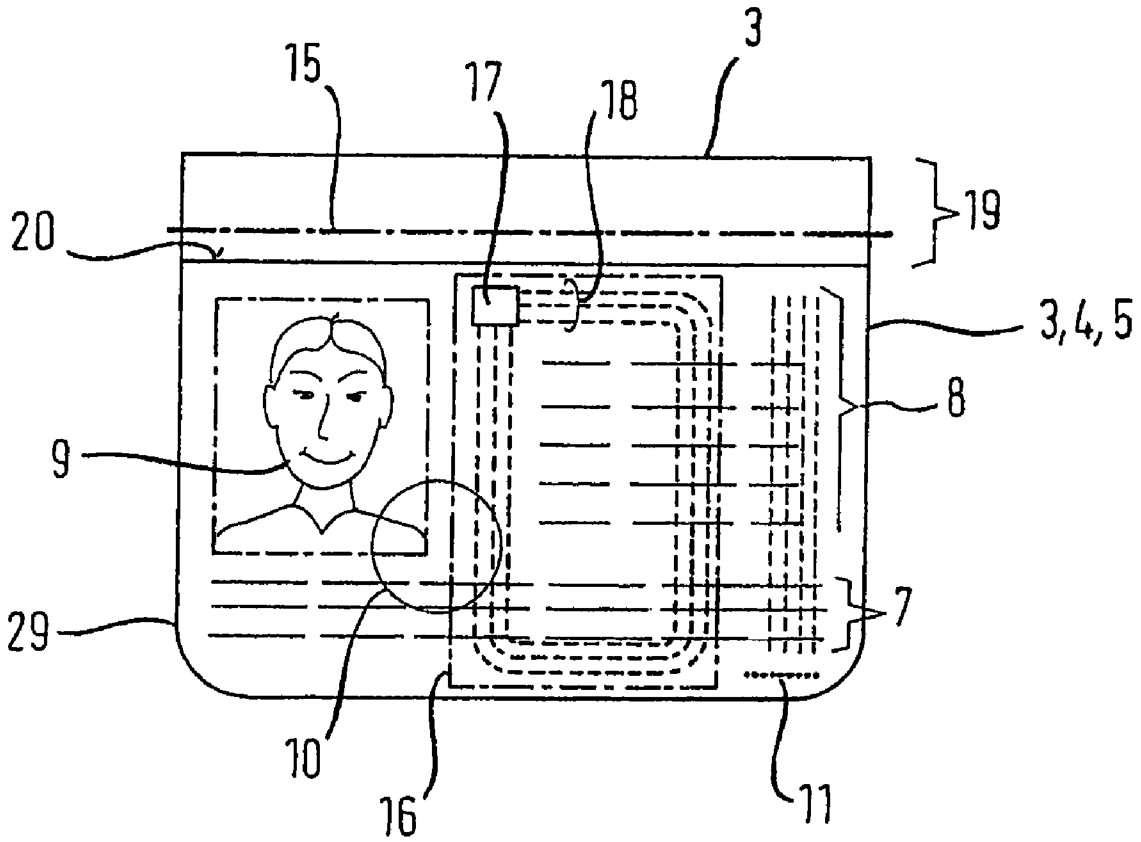
FIG. 2 is the top view of the personalized page.

FIG. 2 is a top view of the personalized page 3, 4, 5. In accordance with the invention, the core stratum 3 extends across the entire personalized page, including the excess length 19. However, the plastic layers of the front side 4 of the personalized page and the back side 5 of the personalized page do not extend across the full width of the core stratum 3, but rather end at the edge 20 and are exteriorly edged with a common contour 29. Thus, only the flexible core 3 is to be sewn at the seam or bending site 15, while the rest of the personalized page has substantially higher stiffness due to the laminated polycarbonate layers. The exterior contour 29 is preferably obtained by punching the bound passport 1.

An RFID element 16 with an IC element 17 and a coil 18 is integrated into the personalized page 3, 4, 5, the position shown being arbitrary. The RFID element 16 can also be designed either smaller or even larger with respect to the desired specifications.

The IC element 17 is preferably positioned in the vicinity of the seam 15, because this location can be expected to be subjected to lower mechanical loads.

The personalized data such as the ICAO line 7, personalized data 8, and photo 9 are produced in the finished passport 1 by means of laser irradiation, whereby the IC element 17 is also electronically programmed with the corresponding personal data or biometric data in the same working step.

Frequently a diffractive security element 10 is required for increasing protection against falsification. In the present example it is integrated into the strata 24, 25. Since this diffractive element 10 is largely transparent, it can be arranged such that it covers the photo 9 in places.

Since the personalized page 3, 4, 5 is constructed by means of laser irradiation, the passport number can also be burned into the area of the numbering 11 in the form of a microperforation and/or the photo can be added as a so-called "shadow image" by means of microperforations in addition to or adjacent to the actual photo 9.

Figure 3:
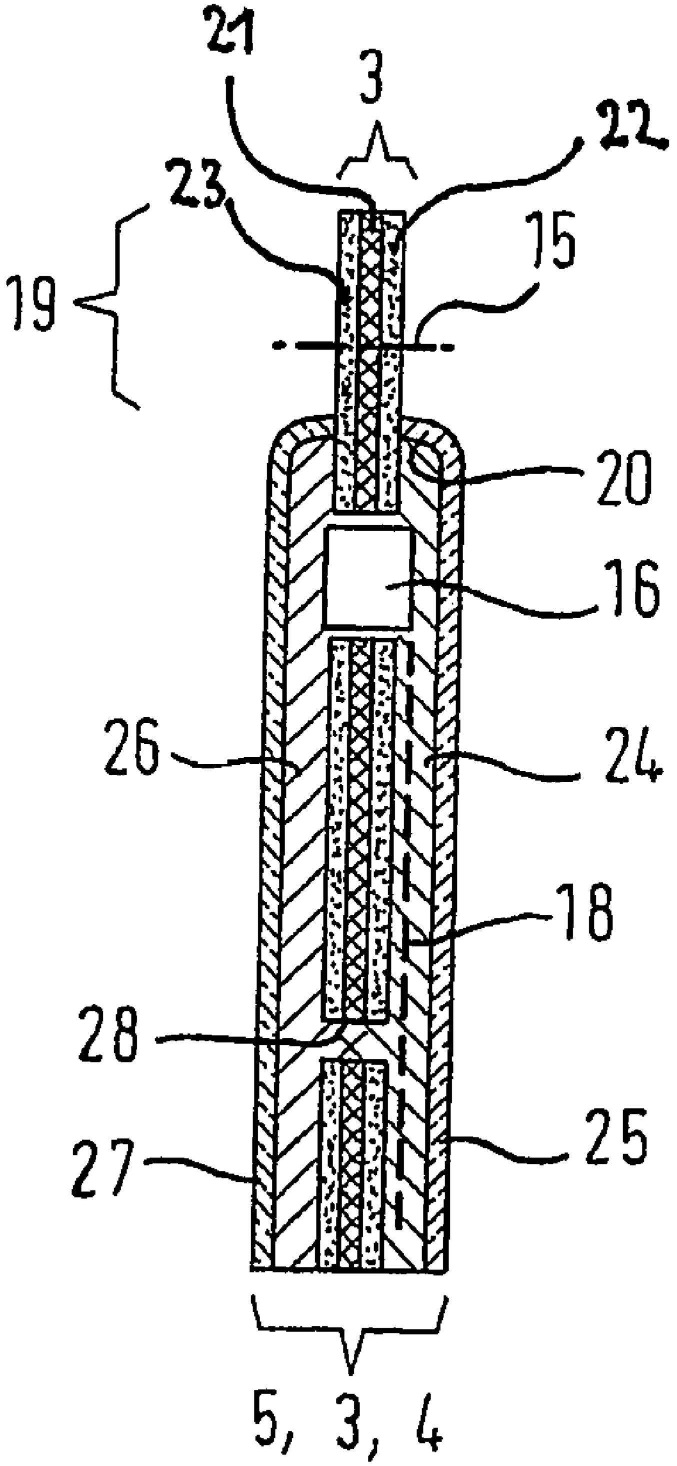
FIG. 3 is a section through the personalized page with an RFID element in the textile layer.

FIG. 3 depicts a section through the personalized page 3, 4, 5 with an RFID element 16 in the core stratum 3. The layers 24 and 26 are embodied as opaque white polycarbonate layers. Both the front side and the back side of these is inseparably joined to a laser-capable polycarbonate layer 25, 27.

In this sectional depiction, the core stratum 3 is formed from three strata, whereby in special cases additional strata or layers might be reasonable and even necessary. The textile layer 21 comprises a polyester fabric and/or a polyester satin fabric and/or a cotton fabric and/or a cotton blend fabric and/or a microfiber fabric and/or a non-woven fabric made of thermoplastic fibers. The thickness of the fabric 21 is 50 to 300 μm, preferably 100 to 200 μm. The fabric has security threads woven therein, or is woven from security yarns, or can be printed. Preferably machine-readable marking substances are used. In particular, marking substances that can be activated in the near infrared range can be added that can be read through layers arranged thereover, since, for example, conventional printing inks and opaque thermoplastic films are penetrated by NIR radiation in the metrologically interesting range of 800 to 1100 nm.

Excitation is performed using LED or laser radiation sources with appropriate optics, and the data are preferably also read out in the NIR range, whereby the conventional silicon photo diodes can be used since they have high sensitivity up to about 1000 nm and slightly more. The responding signal can be evaluated or verified in terms of frequency and/or time, i.e., in a time-resolved manner. In particular, so-called up-conversion pigments are suitable, such as a fine-grain inorganic gadolinium oxysulfide and the like. Preferably response signals in the NIR range are evaluated when such machine-readable markings are integrated in the interior of the laminate structure 21, 22, 23.

The fabric 21 is provided with one or two bonding agent layers 22, 23. These layers can be thermoplastic in nature and in this case must have a corresponding heat resistance or can be designed partially reactive or reactive. In each case a bond is attained that makes it impossible to separate the layers 21, 22, 23, 24, 25, 26, and 27 without visibly damaging or destroying them.

In terms of production engineering, the bonding agent layers 22, 23 can cover the entire surface of the fabric 21, that is, the excess length 19, as well. Depending on the type and thickness of the fabric, however, the excess length 19 can be kept free of one or both bonding agent layers 22, 23.

In one variant, the use of the fabric 21 in the production of the articulation 15 in the area of the seam of the personalized page 3, 4, 5 can occur in that the fabric 21 in roll form is provided with one or both bonding agent layers 22, 23 and are then laminated together, in a single image, in strip form, or in multiple images, with the other layers 24, 25, 26, 27 to make a personalized page 3, 4, 5. The lamination is normally performed in a hot and cold transfer press. Lamination temperatures ranging from about 150° C. to more than 200° C. are used, and in particular, temperatures ranging from 190° C. to about 205° C. are used for high security laminate bonds based on polycarbonate. The surface pressures in the hot press are generally 200 to 400 $N/cm^2$, and the surface pressures in the cold press are generally 400 to 600 $N/cm^2$. Using vacuum support for the lamination process can prevent interfering air inclusions.

Depending on the type of IC element 17 and the possible type of contacting, the RFID coil 18 can be produced using etching in copper or aluminum, or by means of silver through plating, or by means of copper wire winding or laying technique.

As stated in the foregoing, the personalized page 3, 4, 5 is produced in single images, in strip form, or in multiple images. The contour 29 is produced using a punch tool or cutting tool. It can be advantageous that the films 24, 25, 26, 27 and any additional films are embodied such that they designed are in a size large enough to include the excess length 19, but in the area of the excess length 19 to the bonding agent side 22, 23 are provided with a separating coating, for example, by means of screen printing. The contour punches can then punch the entire contour 29 and at the same time produce the personalized page edge 20, such that only the films 24, 25, 26, 27 are punched on the edge, and the core strata 21, 22, 23 are not punched.

In all of the punch technologies, the punch edge 29 is quite essential since a fabric 21 is integrated as core layer and this fabric 21 must be edged with no fringe.

In this depiction, the transparent films 25, 27 are conducted over the edge of the opaque plastic layers 24, 26, but terminate prior to the excess length 19 in which the seam 15 is provided. In addition, in this embodiment it is even possible to use a relatively thick RFID element 16, which however makes possible a personalized page 3, 4, 5 that is thinner overall than would otherwise be required for relatively thick RFID elements 16.

In addition, in this depiction, a recess 28 in the core stratum 3 is shown. A fused bond between the layers surrounding the core stratum 3 is possible with one or a plurality of such recesses 28 in the core strata 21, 22, 23. The holes 28 can be lasered or punched. They have a pre-determined circular, oval, or rectangular shape and can also themselves be used as an additional security feature during authentication.

LEGEND

1 Personal document
2 Book cover
2' Book cover printed side
3 Core stratum
4 Plastic layer of front side of personalized page
5 Plastic layer of back side of personalized page
6 Book cover inside page (projection front)
7 ICAO line
8 Personalized data
9 Passport photo
10 Diffractive structure
11 Number punched
12 Inside page; 12' inside page back side
13 Inside page; 13' inside page back side
14 Inside page; 14' inside page back side
15 Seam (personal document articulation)
16 RFID element
17 IC element (chip module, interposer)
18 Coil
19 Excess length of personalized page
20 Edge of personalized page
21 Textile layer
22 Bonding agent for personalized page front side
23 Bonding agent for personalized page back side
24 Opaque personalized page front side
25 Transparent laser-capable personalized page front side
26 Opaque personalized page back side
27 Transparent laser-capable personalized page back side
28 Recess in core stratum
29 Contour/punched edge

The invention claimed is:

1. A personal document in book form, comprising:
- a book cover;
- interior pages;
- a multi-layer personalized page containing personal data, an attachment of said personalized page and said interior pages in said book cover including a seam, said multi-layer personalized page having a core stratum comprising a layer of woven or non-woven textile fabric, an RFID element with an IC element for contactless transmission of biometric data about the holder of said personal document being integrated in said core stratum, said core stratum being joined on both sides thereof, each to a thermoplastic layer which covers the core stratum up to a section of excess length, said personalized page being sewn by said seam in an area of said excess length; and
- a diffractive element laminated between said layers of said multi-layer personalized page,
- the textile fabric of the layer of textile fabric being selected from the group consisting of polyester textile fabric, polyester satin textile fabric, cotton textile fabric, cotton-blend textile fabric, and textile fabric comprised of thermoplastic microfibers.

2. A personal document according to claim 1, wherein said textile layer includes at least one machine-readable security element.

3. A personal document according to claim 2, wherein said security element includes security pigments and/or a security print.

4. A personal document according to claim 1, wherein said textile layer is provided on at least one page with a bonding agent layer.

5. A personal document according to claim 4, wherein said bonding agent layer is applied in a form of a film.

6. A personal document according to claim 5, wherein said bonding agent layer is applied in a form of a perforated film.

7. A personal document according to claim 4, wherein said bonding agent layer is applied in a form of a random fabric.

8. A personal document according to claim 4, wherein said bonding agent layer is applied in a form of a coating or print.

9. A personal document according to claim 4, wherein said bonding agent layer comprises a thermoplastic layer that joins said textile layer to said plastic layer, covering said core stratum in a manner that cannot be released without visibly damaging said layers.

10. A personal document according to claim 4, wherein said bonding agent layer has a reactive resin or a partially reactive resin mixture that permanently joins said textile layer and said plastic layer covering said core stratum.

11. A personal document according to claim 1, wherein said core stratum is joined to said thermoplastic layers on said front side and on said back side by lamination.

12. A personal document according to claim 1, wherein said core stratum has at least one recess through which said thermoplastic layers of said front side and said back side join one another in a fused compound.

13. A personal document according to claim 1, wherein said thermoplastic layers covering said core stratum have at least a first opaque thermoplastic film and at least one transparent laser-capable film.

14. A personal document according to claim 1, said thermoplastic layers covering said core stratum comprise polycarbonate, and/or polyethylene thereptthalate, and/or high-density polyethylene, or a blend of thereof.

15. A personal document according to claim 13, wherein said laser-capable film contains personal data and the photo of the holder of said personal document.

16. A personal document according to claim 14, wherein said laser-capable film contains personal data and the photo of the holder of said personal document.

17. A personal document according to claim 13, wherein said transparent laser-capable film is covered with a protective layer.

18. A personal document according to claim 1, further comprising a coil integrated into said personalized page for contactless transfer of biometric data for the holder of said personal document.

19. A personal document according to claim 18, wherein said coil is integrated into the core stratum of said personalized page.

20. A personal document according to claim 1, further comprising a photopolymer layer arranged between said layers of said multi-layer personalized page into which a shadow image of a photo of the holder of the personal document is inscribed.

21. A personal document according to claim 1, wherein said personalized page has lasered perforation numbering.

22. A personal document according to claim 20, wherein said shadow image is formed by microperforations.

23. A personal document in book form, comprising:

a book cover;

interior pages;

a multi-layer personalized page containing personal data, an attachment of said personalized page and said interior pages in said book cover including a seam, said multi-layer personalized page having a core stratum comprising a layer of woven or non-woven textile fabric, an RFID element with an IC element for contactless transmission of biometric data about the holder of said personal document being integrated in said core stratum, said core stratum being joined on both sides thereof, each to a thermoplastic layer which covers the core stratum up to a section of excess length, said personalized page being sewn by said seam in an area of said excess length; and a photopolymer layer arranged between said layers of said multi-layer personalized page into which a shadow image of a photo of the holder of the personal document is inscribed, the textile fabric of the layer of textile fabric being selected from the group consisting of polyester textile fabric, polyester satin textile fabric, cotton textile fabric, cotton-blend textile fabric, and textile fabric comprised of thermoplastic microfibers.

24. A personal document according to claim 23, wherein said shadow image is formed by microperforations.

25. A personal document according to claim 24, wherein said shadow image is inscribed adjacent the photo of the holder.

* * * * *